United States Patent [19]

Dumoulin et al.

[11] Patent Number: 4,999,148
[45] Date of Patent: Mar. 12, 1991

[54] METHOD AND APPARATUS FOR MAKING REINFORCED INSULATED ELECTRICAL CONDUCTOR

[75] Inventors: Andre Dumoulin, Ville De Deux Montagnes; Michel Gervais, Verdun, both of Canada

[73] Assignee: Northern Telecom Limited, Montreal, Canada

[21] Appl. No.: 397,934

[22] Filed: Aug. 24, 1989

[51] Int. Cl.⁵ .............................................. B29C 47/02
[52] U.S. Cl. .................................... 264/174; 264/229; 425/114; 425/192 R
[58] Field of Search .............. 264/174, 172, 136, 229; 425/113, 114, 466, 192 R

[56] References Cited

U.S. PATENT DOCUMENTS

| | | | |
|---|---|---|---|
| 3,719,444 | 3/1973 | Benjamin et al. | 425/114 |
| 3,879,518 | 4/1975 | Ney et al. | 264/174 |
| 4,050,867 | 9/1977 | Ferrentino et al. | 264/174 |
| 4,151,237 | 4/1979 | Ney | 264/174 |
| 4,212,612 | 7/1980 | Piper et al. | 425/114 |
| 4,568,507 | 2/1986 | Baxter | 264/174 |
| 4,710,594 | 12/1987 | Walling et al. | 264/174 |

FOREIGN PATENT DOCUMENTS

| | | | |
|---|---|---|---|
| 51-47281 | 4/1976 | Japan | 425/113 |
| 16542 | of 1911 | United Kingdom | 425/113 |

Primary Examiner—Jeffery Thurlow
Attorney, Agent, or Firm—R. J. Austin

[57] ABSTRACT

Extrusion die assembly and method of insulating conductor in which tensile reinforcing elements are introduced into the conductor insulation as it is being extruded. During extrusion, the reinforcing element engage outwardly against a position control member to limit their outward movement. The extrudate flows to either side of the position control member and recombines into a single unitary mass downstream of the control member.

4 Claims, 3 Drawing Sheets

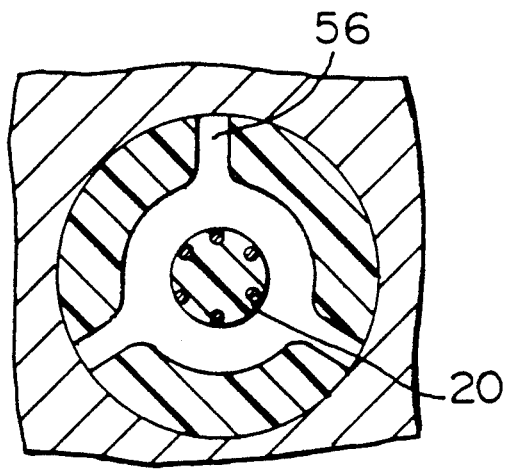
FIG. 10
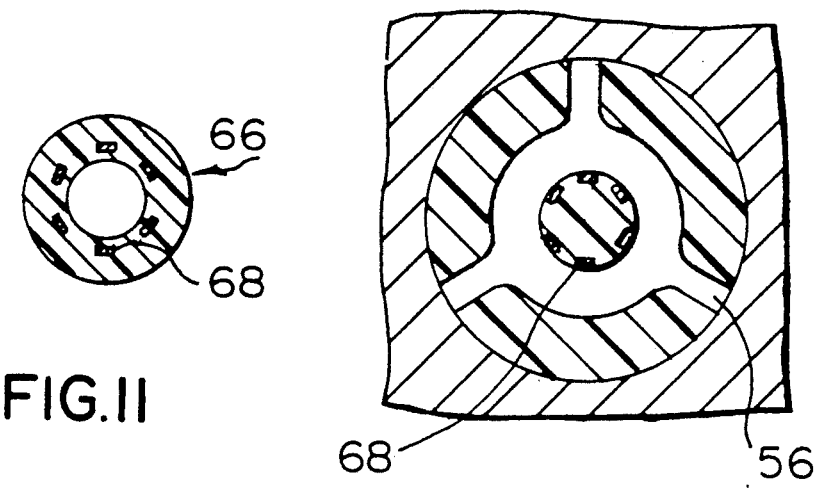
FIG. 11
FIG. 12

METHOD AND APPARATUS FOR MAKING REINFORCED INSULATED ELECTRICAL CONDUCTOR

This invention relates to methods and apparatus for making reinforced insulated electrical conductor.

In one form of electrical conductor i.e. insulated telecommunications conductor, axially extending tensile reinforcement is embedded in the insulation, to resist extension of the insulated conductor under end loadings. Such reinforced insulated conductor may be of the type normally referred to as "drop wire cable" which is normally strung between a pole and the wall of a customer's premises for connecting an incoming line with a telephone service within the premises. The weight of the drop wire is taken by its ends which are gripped by holding brackets on the pole and on the wall of the premises. This weight places the drop wire continuously in tension. Unless tensile reinforcement is provided, the insulation and conductor tend to extend under their weight thus resulting in a reduction in diameter of the conductor thereby deleteriously affecting any signal which is transmitted along it.

Unfortunately, it is exceedingly difficult to locate the tensile reinforcing elements in positions suitably spaced between the conductor and the outer surface of the insulation. As a result, it is not unusual for a tensile reinforcing element to lie extremely closely to the outside surface of the insulation and even for the element to break through this surface thereby providing a drop wire which is aesthetically unacceptable and which will also allow for wicking of moisture between the reinforcing element and the surrounding insulation material.

The above-described positioning problem of the tensile reinforcing elements is overcome by the use of an extrusion head design described in U.S. Pat. No. 4,050,867 granted on Sept. 27, 1977. In this patent, the tensile reinforcing elements are fed through a core tube of the extrusion die (the core tube being referred to as a mandrel in the patent), and are then caused to pass through a central hole provided in a conical member which surrounds the downstream end of the core tube and extends towards the extrusion orifice. Passage through the central hole in the frusto-conical member causes the tensile reinforcing elements to be disposed a spaced distance radially within the surface of the extrusion orifice. Hence, the tensile reinforcing elements are maintained a spaced distance from the outer surface of the finished insulation. However, the extrusion die described in U.S. Pat. No. 4,050,867 not only provides for the accurate location of the tensile reinforcing elements, but simultaneously provides for the formation of two insulation layers around the conductor, i.e. an inner layer and an outer layer. The interfacial region of these two layers occurs at the location of the tensile reinforcing elements so that the elements are not embedded within a single insulating layer construction. Tensile loads cannot be transmitted between the two layers as effectively as through the total thickness of a single layer. Also, because the tensile reinforcing elements only lie at the interface between the two layers, then tensile load cannot be transmitted effectively between either of the layers and the tensile reinforcing elements themselves. In addition, the interface between the two layers is a potential source of loss of physical performance in terms of life expectancy, because of excessive loss of plasticizer at the interface. Thus, the extrusion die described in the above patent produces a reinforced insulated conductor which suffers certain physical disadvantages.

The present invention provides an extrusion die assembly which may be used to positively control the position of tensile reinforcing elements embedded in the insulation while overcoming the problems inherent in use of U.S. Pat. No. 4,050,867. The present invention also provides a method of insulating an electrical conductor while providing a reinforcement in the insulation and which also overcomes the above problems.

Accordingly, the present invention provides an extrusion die assembly having: a die housing and defining an extrusion die orifice; core tube means for directing an elongate electrical conductor material and elongate tensile reinforcing elements along passlines extending through the die orifice with the passlines of the tensile reinforcing elements angularly spaced apart around the passline for the length of electrical conductor; and position control means for limiting the radial outward movement of the reinforcing elements to positions spaced within the surface of the extrusion die orifice, said position control means disposed between the downstream end of the core tube means and the die orifice while defining at least one axially extending gap between the position control means and the downstream end of the core tube means to enable extrudate disposed downstream of the core tube means to flow radially to either side of the position control means and to recombine into a non-interfacial single unitary mass of extrudate downstream of the position control means.

Hence, while the position control means may be used for limiting the radial outward movement of the tensile reinforcing elements, as indicated by the invention, it does not result in the production of two insulating layers. This is at least partly because of the provision of the axially extending gap which prevents complete separation of the extrudate into two streams until the extrudate has passed beyond the core tube means. The position control means is thus of minimum effective axial length which is not sufficient to create two separate layers which maintain their distinctiveness up to the time they reach and are extruded from the die orifice. This structure is thus distinct from one in which the position control means extends a substantial distance axially telescoped with the core tube means so as to separate two annular streams of extrudate over a substantial distance.

The position control means may comprise an annulus located downstream from the core tube means and arms may extend radially outwards from the annulus to hold it in a position surrounding the passlines of the conductor and of the reinforcing elements with the arms spaced apart circumferentially around the annulus. Alternatively, the position control means may comprise individual eyelets for passage therethrough for the individual tensile reinforcing elements with the eyelets appropriately located downstream from the core tube means and held in position by locating arms which extend radially outwardly from the eyelets.

The invention further provides a method of insulating an elongate electrical conductor while providing longitudinally extending reinforcement to the insulation comprising: passing the elongate electrical conductor and elongate tensile reinforcing elements from core tube means, through a chamber of an extrusion die containing flowing extrudate, and directing the conductor and reinforcing elements through a die orifice as the extrudate is being extruded from the orifice to form insulation surrounding the conductor with the tensile reinforcing elements embedded in the insulation and angularly spaced apart around the electrical conductor; and, during passage of the reinforcing elements from the core tube means to the die orifice, limiting radial outward movement of the reinforcing elements by a position control means, to positions spaced within the surface of the extrusion die orifice while extrudate disposed within the chamber and downstream of the core tube means flows radially either to one side or the other of the position control means and recombines into a non-interfacial single unitary mass of extrudate downstream of the annulus.

Embodiments of the invention will now be described, by way of example, with reference to the accompanying drawings, in which:

FIG. 10 is a cross-sectional view taken along line X—X in FIG. 9 of the die assembly in use;

FIG. 11 is a view similar to FIG. 3 of another reinforced insulated conductor construction made by the extrusion die assembly of the embodiment; and FIG. 12 is a cross-sectional view similar to FIG. 10 of the extrusion die assembly of the embodiment during manufacture of the construction shown in FIG. 11.

Figure 1:
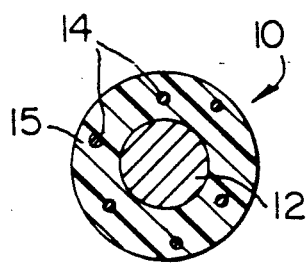
FIG. 1 is a cross-sectional view of an insulated and reinforced conductor according to the prior art.

In FIG. 1 is shown a cross-sectional view through one construction of insulated and reinforced electrical conductor according to the prior art. This construction may be used typically as a drop wire construction, i.e. to be hung at its ends to an outside pole and the wall of a customer's premises. As can be seen, the insulated conductor 10 comprises a conductor wire 12 surrounded by a layer of insulation 15 and a plurality, namely six, tensile reinforcing elements 14 which extend for the full length of the structure 10. These elements 14 are of circular cross-section.

Figure 2:
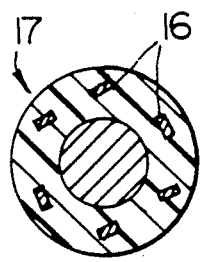
FIG. 2 is a cross-sectional view similar to FIG. 1 of another example of the prior art.

In FIG. 2, there is shown another example of a prior art reinforced and insulated conductor 17 which is of similar construction to that shown in FIG. 1 except that the reinforcing elements 16 are rectangular in section.

As can be seen from considering both FIGS. 1 and 2, the reinforcing elements 14 and 16 are not symmetrically positioned within the insulation nor do they lie at substantially equal depths within the insulation. As can be seen from both figures, some of the elements 14 and 16 lie substantially close to the outer surface of the insulation thereby providing a non-symmetrically reinforced structure. In particular, with regard to FIG. 2, the reinforcing elements 16 may be tilted as shown so that edges of the elements face towards the outer surface of the insulation and lie extremely close to it. In such constructions, with the edges facing outwardly in this way, it is not unknown for the reinforcing elements to cut through the insulation eventually to be exposed on the outside of the structure. When this occurs, the structure commences to deteriorate rapidly and this is assisted by the wicking of moisture between the insulation and the tensile reinforcing element from the position at which it is exposed.

The structures, exemplified by the prior art FIGS. 1 and 2, are made by extruding insulation onto the conductor wire and around the tensile reinforcing elements in extrusion die assemblies simply provided with a core tube for directing both the reinforcing elements and the conductor wire through a chamber containing the extrudate as they proceed towards the die orifice. With such die assemblies, no control is placed upon the radial position of the reinforcing elements.

Figure 3:
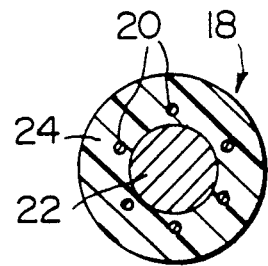
FIG. 3 is a cross-sectional view of a reinforced and insulated conductor made by an extrusion die assembly according to an embodiment of the invention.
Figure 5:
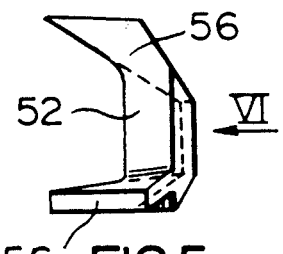
FIG. 5 is a side elevational view of a position control means of the assembly of the embodiment.
Figure 6:
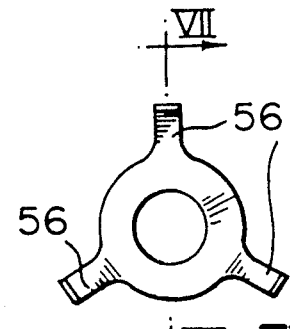
FIG. 6 is a view in the direction of arrow VI in FIG. 5 of the position control means.
Figure 7:
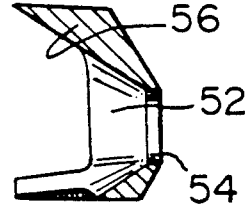
FIG. 7 is a cross-sectional view through the positional control means taken along line VII—VII in FIG. 6.

However, as shown by FIG. 3, in a die assembly, according to an embodiment of the invention, a reinforced and insulated conductor structure 18 is produced and which has tensile reinforcing elements 20 disposed at substantially equal radial distances from the conductor 22. The reinforcing elements are thus disposed at substantially equal depths from the outer surface of an insulation 24. This insulation is formed as a single unitary mass, i.e. it is not provided by two layers of insulation with interfacial regions.

Figure 4:
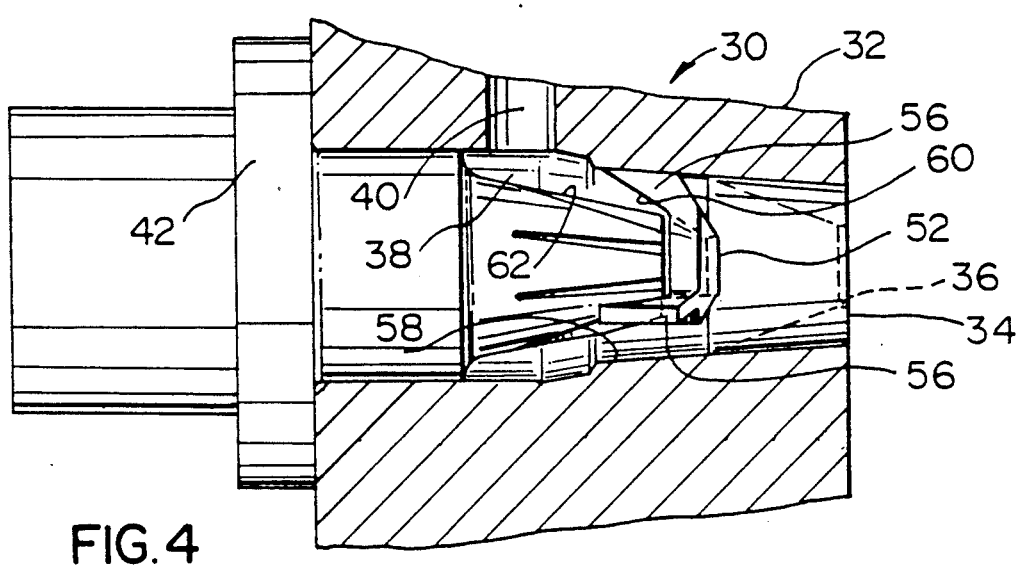
FIG. 4 is a longitudinal cross-sectional view through an extrusion die assembly according to the embodiment of the invention and showing a core tube means in side elevation.
Figure 8:
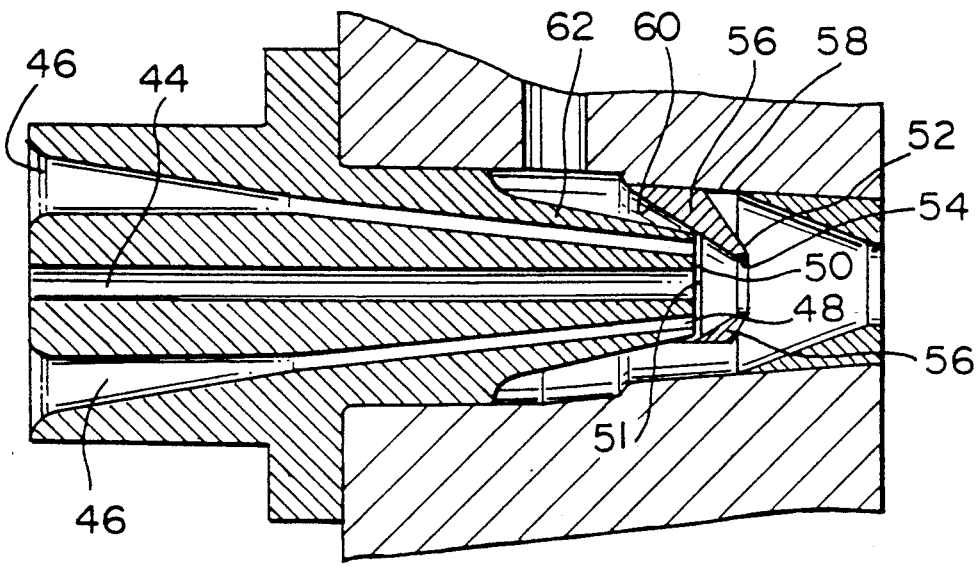
FIG. 8 is a longitudinal cross-sectional view through the extrusion die assembly including a section through the core tube means and position control means.

As shown in FIG. 4, an extrusion die assembly 30 according to the embodiment, comprises a die housing 32 holding a die 34 which defines a die orifice 36. The die housing defines a chamber 38 for the flow of extrudate through an inlet passage 40 from an extruder (not shown). Within the chamber is contained a core tube means in the form of a core tube 42 which is assembled to the housing in conventional fashion with a downstream end of the core tube directed towards the extrusion die 34. The core tube, as shown in FIG. 8, defines a coaxial passage 44 for guiding the electrical conductor 22 through the housing and coaxially through the extrusion die 36. The core tube also defines a plurality of passages 46 having downstream outlet ends 48 emerging at a downstream end face 50 of the core tube in equally spaced-apart positions around the passage 44 and lying on a common pitch circle.

Disposed between the core tube and the die orifice is a position control means forming part of an integral structure which is retained in its desired position within the chamber 38. The position control means comprises an annulus 52 which, as shown in FIGS. 4 and 8, lies entirely downstream of the downstream end 50 of the core tube thereby producing an axial gap 51 between the core tube and the annulus. The annulus 52 has a central orifice 54 which is smaller in diameter than the die orifice 36 so as to limit the radial outward movement of the tensile reinforcing elements, as they pass through the orifice 54, to positions spaced within the surface of the die orifice. To ensure that the elements do engage the surface of the orifice 54 so that they are all disposed upon the same pitch circle, as shown in the finished product in FIG. 3, the downstream ends 48 of the passages 46 lie radially outwardly from the surface of orifice 54 whereby the elements, when tensioned in use, as shown in FIG. 8, need to pass against the surface of the orifice 54.

As shown in FIGS. 4 to 8, the integral structure which includes the annulus 52 also comprises three integral arms 56 which extend radially outwards from the annulus, the arms 56 being suitably shaped at their outer ends so as to fit snugly against a tapering surface 58 of the die housing whereby the structure is retained fixedly in its desired position within the housing with the annulus spaced from the wall of the chamber 38. As shown in the figures, the arms 56 are inclined axially of the annulus in the upstream direction of extrudate movement. An upstream end surface 60 of each arm converges on a frusto-conical surface 62 of a downstream end portion of the core tube means. As the arms axially overlap the frusto-conical surface 62, then in use, the surfaces 60 of the arms direct some of the extrudate passing through the chamber 38 through the gap 51 towards the orifice 54 whereas extrudate lying to each side of each arm passes either through the gap 51 or radially outside the annulus 52.

Figure 9:
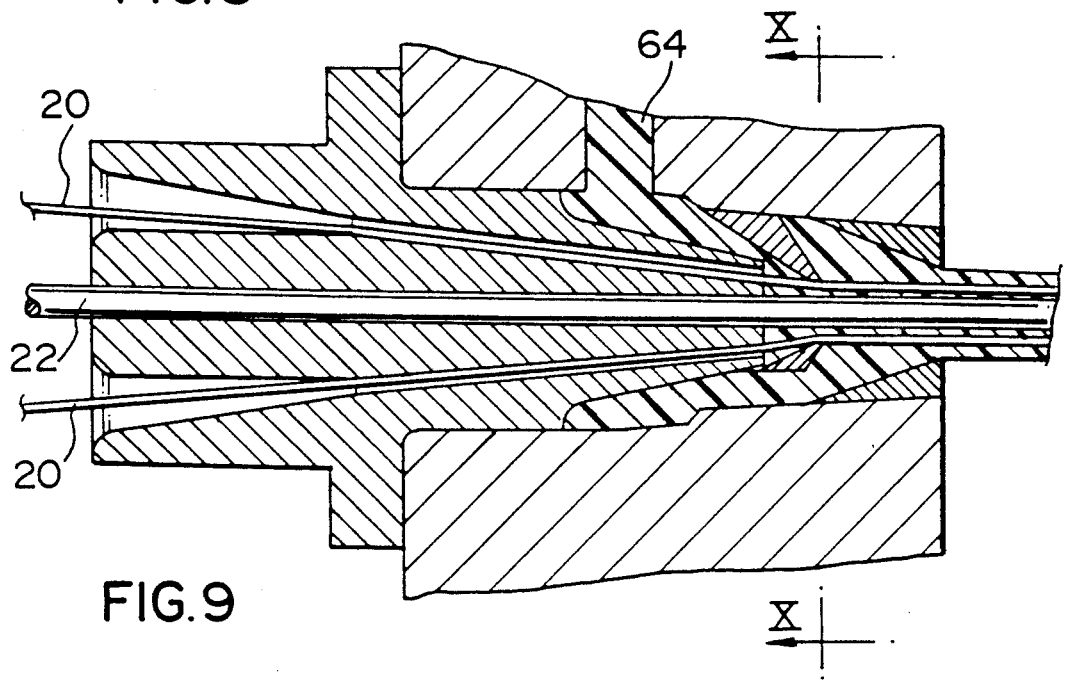
FIG. 9 is a view similar to FIG. 8 and showing the die assembly in use.

In use, and as shown in FIG. 9, extrudate 64 passes through the chamber 38 simultaneously with the movement of the conductor 22 and the reinforcing elements 20 through their respective passages 44 and 46 towards the die orifice 36. As already discussed above, the elements 20 pass from the passages 46 and are caused to engage the peripheral surface of the orifice 54 as they proceed towards the die orifice. This is shown by FIG. 10. Also, because of the provision of the gap 51, then extrudate upstream of the annulus 52 passes either through the orifice 54 or radially outside the annulus. That passing through the gap is influenced to do so by surfaces 60 of the arms. Thus, no axially extending annular passage is formed between the frusto-conical surface 62 of the core tube means and the annulus which could separate the extrudate into two separate layers of flowing material, and which could result in an interfacial region downstream of the annulus and thus in two layers of insulation. In contrast, with the embodiment described and according to the invention, extrudate directly upstream from the annulus 52 may pass either inside or outside the annulus and the arms effect changes in directional flow of the extrudate in adjacent regions of the chamber 38. Hence, as the extrudate passes beyond the annulus 52 the flow of extrudate is not unidirectional and it easily recombines to form a single unitary mass of extrudate with no interfaces. This tendency to recombine of the extrudate mass is assisted by the resultant short axial length of the annulus 52. As a result, a single layer of insulation, such as shown at 24 in FIG. 3, results and within which the reinforcing elements 20 are securely embedded. As the elements 20 are embedded securely within a single layer, then tensile loads may be transmitted efficiently from the insulation into the reinforcing elements so as to resist extension of the insulated conductor.

The extrusion die assembly may be used to provide an insulated conductor 66 of similar construction to that shown in FIG. 3, but in which reinforcing elements 68 are of rectangular section as shown in FIG. 11. The elements 68 lie in equally spaced-apart positions upon a common pitch circle within the insulation with all of the elements extending widthwise in a circumferential direction and without tilting of the elements. Thus, none of the elements presents a corner between the sides which could cut into the insulation during flexing of the structure. As shown by FIG. 12, the elements 68 as they pass through the annulus 52 naturally engage the surface of the orifice 54 across the width of the elements so as to control their position.

What is claimed is:

1. An extrusion die assembly having:
   a die housing and defining an extrusion die orifice;
   core tube means for directing an elongate electrical conductor and elongate reinforcing elements along passlines extending through the die orifice with the passlines of the reinforcing elements angularly spaced apart around the passline for the length of electrical conductor; and
   position control means for limiting the radial outward movement of the reinforcing elements to positions spaced within the surface of the extrusion die orifice, said position control means comprising an annulus disposed within an extrudate flow chamber of he die housing and arm spaced-apart circumferentially of the annulus and extending radially outwards from the annulus to hold the annulus in a position spaced from walls of the chamber and surrounding the passlines of the conductor and of the reinforcing elements with the annulus disposed entirely between the downstream end of the core tube means and the die orifice to define a gap extending axially downstream from the downstream end of the core tube means to an upstream end of the annulus to enable extrudate disposed downstream of the core tube means and in the axially extending gap to flow radially to either side of the annulus and to recombine into a non-interfacial single unitary mass of extrudate downstream of the annulus.

2. A die assembly according to claim 1 wherein the arms are inclined axially of the annulus in an upstream direction of the passlines as they extend radially outwards.

3. A die assembly according o claim 2 wherein the core tube means has a frusto-conical downstream end portion inclined at a specific angle to the passlines and the arms extend upstream from the annulus so as axially to overlap the frusto-conical surface with each arm having an upstream surface which faces the frusto-conical surface and converges towards it in a downstream direction.

4. A method of insulating an elongate electrical conductor while providing longitudinally extending reinforcement within the insulation comprising:
   passing the elongate electrical conductor and elongate tensile reinforcing elements from core tube means and through a chamber of an extrusion die containing flowing extrudate, and directing the conductor and reinforcing elements through a die orifice as the extrudate is being extruded from the orifice to form the insulation surrounding the conductor with the tensile reinforcing elements embedded int he insulation and angularly spaced-apart around the electrical conductor; and
   during passage of the reinforcing elements from the core tube means to the die orifice, passing the reinforcing elements through an annulus mounted within and spaced from walls of the chamber so as to limit radial outward movement of the reinforcing elements to positions spaced within the surface of the extrusion die orifice while extrudate disposed within the chamber and downstream of the core tube means flows into a gap extending axially downstream from the downstream end of the core tube means to an upstream end of the annulus and from the axially extending gap flows radially either to one side or the other of the annulus and recombines into a non-interfacial single unitary mass of extrudate downstream of the annulus.

* * * * *